(12) United States Patent
Heyerman

(10) Patent No.: US 8,166,746 B2
(45) Date of Patent: May 1, 2012

(54) ROTOR CONTAINMENT ELEMENT WITH FRANGIBLE CONNECTIONS

(75) Inventor: Jeffrey Bernard Heyerman, Oakville (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 0 days.

(21) Appl. No.: 12/952,636

(22) Filed: Nov. 23, 2010

(65) Prior Publication Data

US 2011/0094100 A1     Apr. 28, 2011

Related U.S. Application Data

(62) Division of application No. 11/411,775, filed on Apr. 27, 2006, now Pat. No. 7,874,136.

(51) Int. Cl.
*F02G 3/00* (2006.01)

(52) U.S. Cl. ........................................ 60/39.091; 415/9

(58) Field of Classification Search .................... 60/779, 60/39.091, 751, 223; 415/9, 208.3, 208.4, 415/224.5
See application file for complete search history.

(56) References Cited

U.S. PATENT DOCUMENTS

| 4,149,824 A | 4/1979 | Adamson |
| 4,169,235 A * | 9/1979 | Higuchi et al. ................. 310/51 |

FOREIGN PATENT DOCUMENTS

| EP | 0718471 A1 | 6/1996 |
| EP | 0908629 A1 | 4/1999 |
| WO | 96/19640 | 6/1996 |

* cited by examiner

*Primary Examiner* — William H Rodriguez
*Assistant Examiner* — Andrew Nguyen
(74) *Attorney, Agent, or Firm* — Norton Robe Canada LLP

(57) ABSTRACT

A containment system for containing fragments of a burst rotor including first and second means for frangibly connecting a containment element to first and second walls, the first and second means rupturing upon being subjected to a load mainly produced by a translational motion of at least one fragment impacting the element.

4 Claims, 3 Drawing Sheets

ROTOR CONTAINMENT ELEMENT WITH FRANGIBLE CONNECTIONS

RELATED APPLICATIONS

This application is a divisional application of U.S. patent application Ser. No. 11/411,775 filed on Apr. 27, 2006 now U.S. Pat. No. 7,874,136.

TECHNICAL FIELD

The invention relates generally to gas turbine engines and, more particularly, to an improved containment system for containing fragments of a burst rotor thereof.

BACKGROUND OF THE ART

Aircraft engines and auxiliary power units are known to include turbines and compressors which rotate about a central shaft at high rotational speeds. Although modern gas turbine engines and auxiliary power units can perform for thousands of hours without any significant malfunction, circumstances have arisen where the rotational hub of a turbine or impeller can burst.

As it is desirable to contain rotor fragments projected by a burst within the shortest distance possible, containment elements are generally provided in close proximity of the rotor for that purpose. However, these containment elements, as well as other engine elements located near the rotor, can transmit substantially large loads to the adjoining structures when struck by a fragment of a burst rotor. As such, even when the fragments are contained by the containment elements, damage from substantial loads produced by the impact of the fragments on the containment elements can propagate through the engine structure, and hence to the aircraft structure, for example through the joints interconnecting the various engine elements.

Accordingly, improvements are desirable.

SUMMARY OF THE INVENTION

It is therefore an object of this invention to provide an improved containment system for containing a burst rotor.

In one aspect, the present invention provides a containment system for containing fragments of a rotor resulting from a burst, the rotor rotating about an axis, the system comprising a containment element having a circumferential surface at least partially surrounding the rotor in proximity thereof, and first and second radial surfaces extending substantially radially with respect to the axis, first and second walls extending on opposite sides of the containment element, first means for frangibly connecting the containment element to the first wall through the first radial surface, and second means for frangibly connecting the containment element to the second wall through the second radial surface, the first and second means rupturing upon being subjected to a load mainly produced by a translational motion of at least one of the fragments impacting the circumferential surface such as to separate the containment element from the first and second walls.

In another aspect, the present invention provides a gas turbine engine comprising a fixed structure, a rotor having blades rotating about an axis, and a containment element at least partially surrounding the blades in proximity thereof for at least partially containing rotor fragments upon bursting of the rotor, the containment element having a first side connected to said fixed structure by a first set of fasteners and a second side connected to said fixed structure by a second set of fasteners, the first and second sets of fasteners being separate from one another, the fasteners being configured to fail upon an impact of at least one of the rotor fragments on the containment element such as to separate the containment element from the fixed structure.

In another aspect, the present invention provides a method of preventing substantial load transmission to a structure of a gas turbine engine upon bursting of a rotor thereof, the method comprising at least partially surrounding the rotor with a containment element, frangibly attaching a first side of the containment element to the structure, such that the first side of the containment element is detached from the structure under a predetermined load impact, and separately frangibly attaching a second opposed side the containment element to the structure such that the second side of the containment element is also detached from the structure under the predetermined load impact.

In another general aspect, the present invention provides a gas turbine engine comprising a structure, a centrifugal compressor having an impeller, and a diffuser ring surrounding the impeller and mounted to the structure via a plurality of fastener assemblies, the fastener assemblies each comprising a pair of frangible fasteners, one from each side of the diffuser ring.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
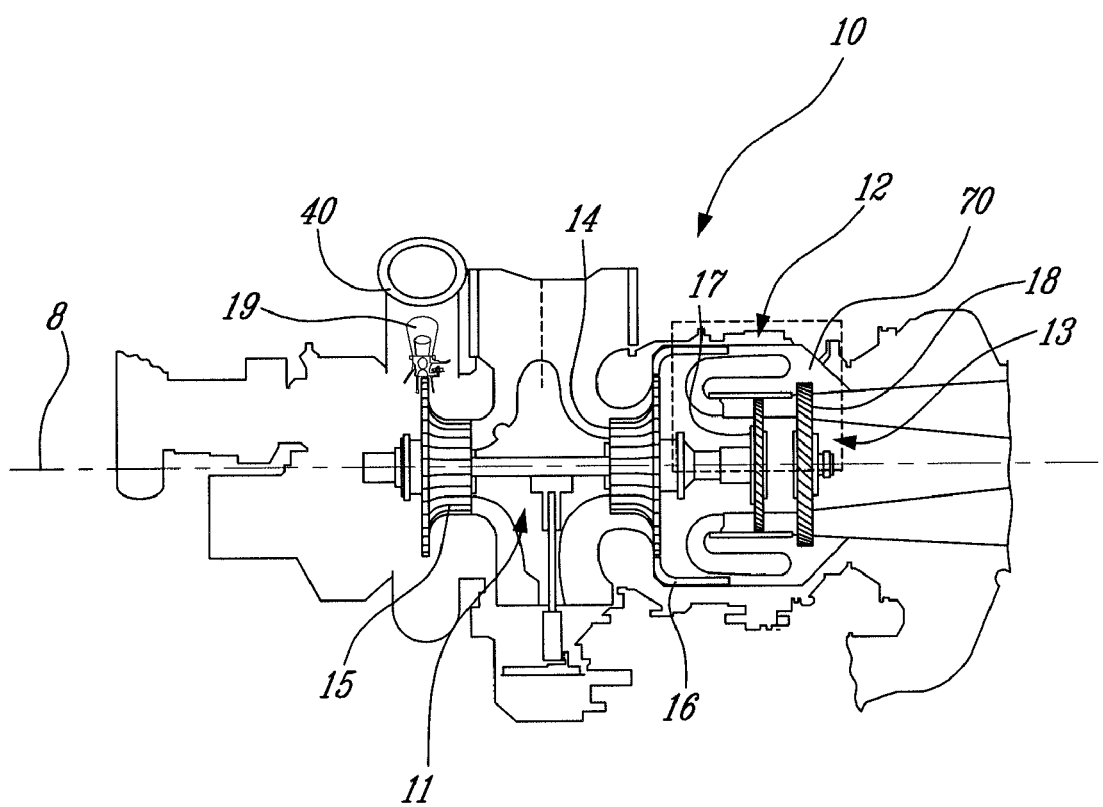
FIG. 1 is a schematic, cross-sectional view of a gas turbine engine.

Referring to FIG. 1, a gas turbine engine 10, which is illustrated as an APU but can be any type of gas turbine engine, is schematically shown. Engine 10 generally comprises a compressor region 11, a combustion region 12 and a turbine region 13. The compressor region 11 generally includes a high pressure compressor 14. Compressed flow from the high pressure compressor 14 goes through a diffuser 16 then enters the combustion region 12 when it is mixed with fuel and ignited. The resultant hot gas flow enters the turbine region 13 where it drives both a high pressure turbine 17 and a powering turbine 18. Compressed flow from the load compressor 15 passes through another diffuser 19 to be used for aircraft pneumatic requirements.

Figure 2:
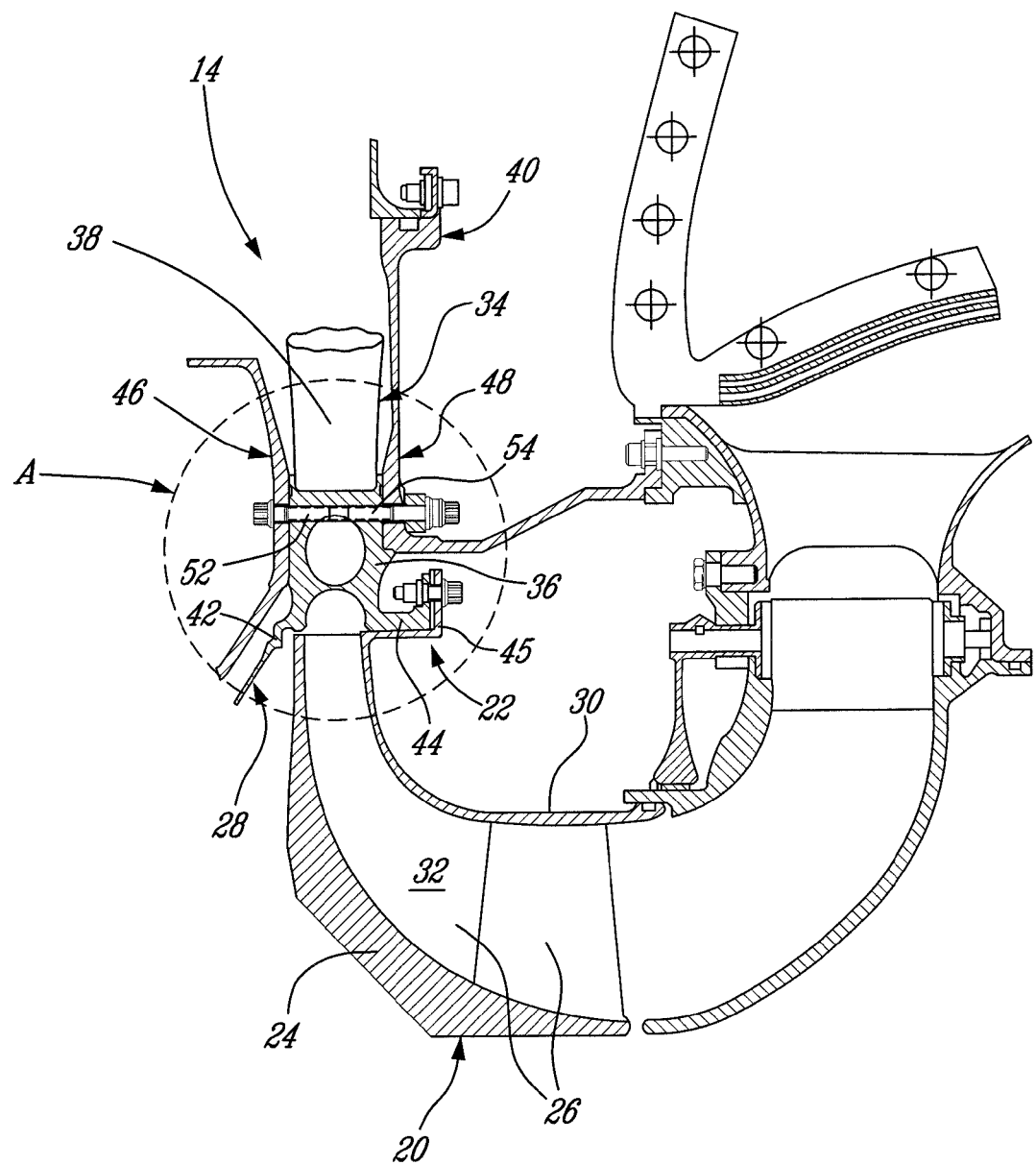
FIG. 2 is a cross-sectional view of part of a compressor section of the gas turbine engine of FIG. 1, including a containment system according to a particular aspect of the present invention.

FIG. 2 shows part of the load compressor 15, which comprises a centrifugal impeller assembly 20 and a containment system 22 in accordance with a particular embodiment of the present invention. The centrifugal impeller assembly 20 comprises an impeller drive shaft (not shown), an annular impeller hub 24 attached to the drive shaft to be rotated thereby, and an annular series of impeller blades 26 integrally connected to the annular impeller hub 24.

The containment system 22 comprises an inner shroud 28 (only partially shown) extending radially inwardly in proximity of the impeller assembly 20 and an outer shroud 30 extending radially outwardly of the impeller assembly 20. The inner and outer shrouds 28, 30 surround, at least partially, the impeller assembly 20. A space between the impeller hub 24 and the outer shroud 30 defines part of a flow path 32 of the engine 10, with the impeller blades 26 extending across that flow path 32.

Optionally, the inner shroud 28 and impeller hub 24 can include complementary engageable catchers and snaggers (not shown) such as to restrain the movement of a burst impeller segment, as described in U.S. Pat. No. 6,224,321 issued May 1, 2001 to Ebden et al. which is incorporated herein by reference.

The air compressed by the compressor 15 is directed into the diffuser 19, which extends across the flow path 32 radially outwardly of the impeller assembly 20 and downstream of the impeller blades 26. The diffuser 19 generally comprises a diffuser ring 36 surrounding the periphery of the impeller assembly 20 and receiving high velocity airflow therefrom. The diffuser 19 converts the high velocity airflow into a high pressure air flow, and includes a series of diffuser pipes 38 in communication with the diffuser ring 36 and directing the high pressure air flow to a duct 40 (see also FIG. 1).

The diffuser ring 36 is integrally connected to an upper end 42 of the inner shroud 28, and has a flange 44 which is bolted to a flange 45 of the outer shroud 30. The diffuser ring 36 also has a circumferential surface 60 (see FIG. 3) which surrounds at least partially the impeller assembly 20 in proximity thereof. The diffuser 19, particularly the diffuser ring 36, thus acts as part of the containment system 22, forming a containment element together with the inner and outer shrouds 28, 30, the containment element at least partially containing the impeller assembly 20. As such, the containment element, particularly the circumferential surface 60 of the diffuser ring 36, is likely to be impacted by impeller fragments in the event of an impeller burst.

Figure 3:
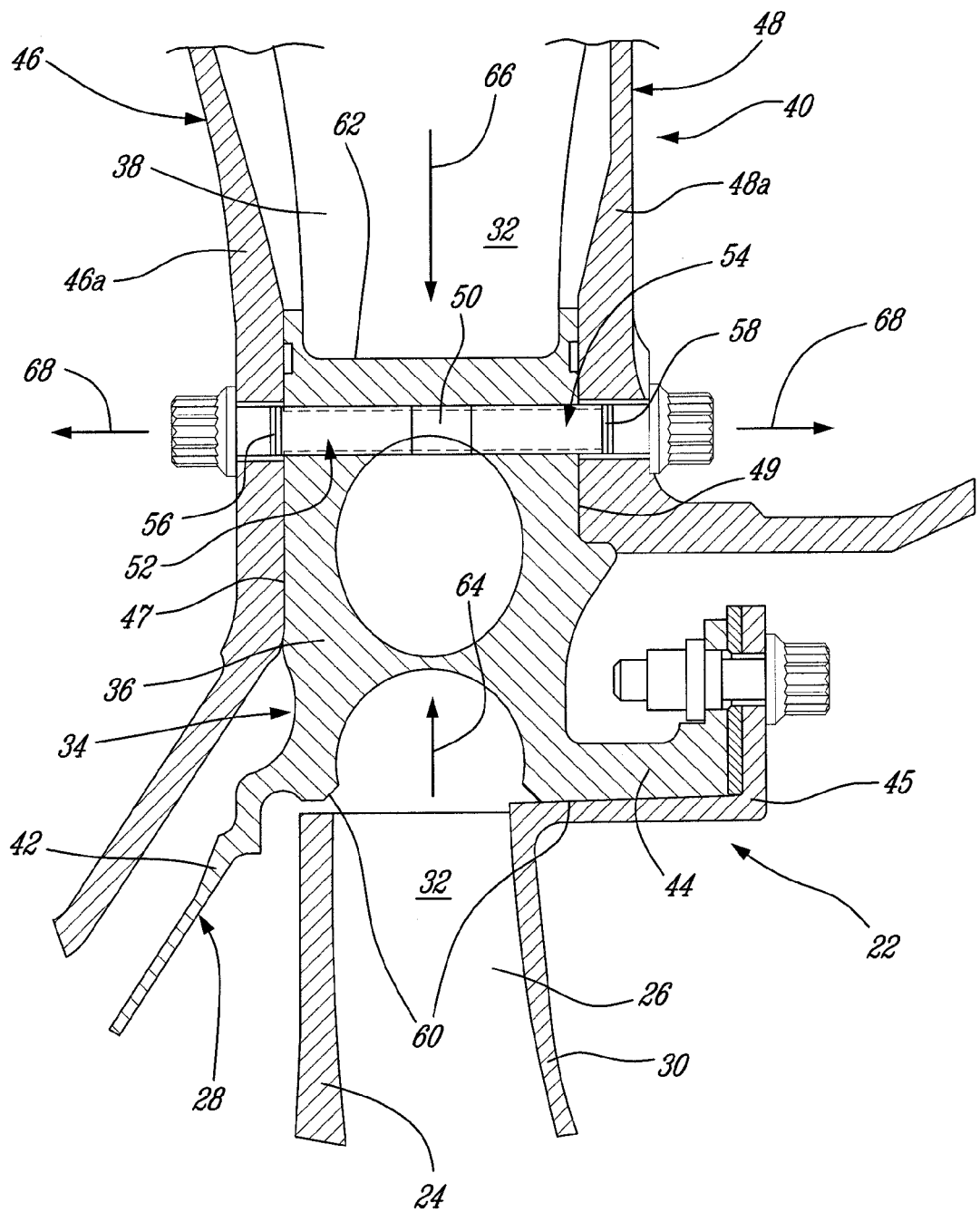
FIG. 3 is an enlarged view of section A of FIG. 2.

Referring to FIG. 3, the duct 40 is defined between first and second spaced apart annular walls 46, 48 which each have a radial portion 46a, 48a extending substantially radially with respect to the axis of rotation of the impeller blades 26 (schematically shown at 8 in FIG. 1), the radial portions 46a, 48a defining part of the flow path 32 therebetween. In the embodiment shown, the first and second walls 46, 48 correspond to the load case and the load scroll of the load compressor 15. The diffuser ring 36 includes first and second radial surfaces 47, 49 also extending substantially radially with respect to the axis of rotation 8 (see FIG. 1) and a series of circumferentially spaced apart threaded bores 50 (only one of which is shown) defined therethrough, the threaded bores 50 extending substantially axially from the first radial surface 47 to the second radial surface 49. The diffuser ring 36 is received between the radial wall portions 46a, 48a, with the first radial surface 47 of the ring 36 adjacent the radial portion 46a of the first wall 46 and the second radial surface 49 of the ring 36 adjacent the radial portion 48a of the second wall 48.

A first frangible means, such as axial fastener 52 which in the embodiment shown is a frangible bolt, is received within each threaded bore 50, and grips the radial portion 46a of the first annular wall 46 and the diffuser ring 36 through the first radial surface 47. A second frangible means, such as axial fastener 54 which in the embodiment shown is also a frangible bolt, is received within each threaded bore 50 opposite of the first frangible fastener 52 and grips the radial portion 48a of the second annular wall 48 and the diffuser ring 36 through the second radial surface 49. It is to be noted that in the present specification and claims, the terms "frangible" and "frangibly" are intended as meaning strong enough to support normal operating loads but easily broken by loads greater than normal operating loads, such as the loads produced in the case of the impact of a burst impeller fragment on the diffuser ring 36, as will be further detailed below. As such, each threaded bore 50 receives and retains a pair of aligned first and second frangible fasteners 52, 54. The frangible fasteners 52, 54 thus retain the diffuser 19, together with the inner and outer shrouds 28, 30, to the structure of the engine 10.

Appropriate types of frangible fasteners 52, 54 will vary depending on the normal operating loads of the impeller assembly 20, and include weakened bolts such as by a weakened point 56, 58 (as shown) which can be for example a series of slots or holes, hollow bolts drilled down their axes, unmodified bolts made of a material having the appropriate stiffness, etc., the frangible fasteners 52, 54 being designed such as to break upon a given impact of a burst impeller fragment with the diffuser ring 36. The given impact of the impeller fragment produces a tension load through the fasteners 52, 54, which are designed to break when loaded with the produced tension load.

An example of the sequence of failure of the joints connecting a containment element to the engine structure, which in the embodiment shown correspond to the frangible fasteners 52, 54 connecting the diffuser ring 36 to the annular walls 46, 48 of the duct 40, will be described below in relation to a "tri-hub burst". The tri-hub burst is an artificially-induced failure producing three equal sections of the impeller hub 24, which is usually achieved by cutting equally spaced slots in the hub 24 to thereby weaken it to the point where it bursts at, or marginally above, the maximum operating speed. The tri-hub failure mode has become one standard for testing, but, in practice, impeller assemblies do not necessarily break in this manner.

Upon a burst, the three fragments of the impeller hub 24, with the corresponding blades 26, have two components of energy or motion: a translational component and a rotational component. Referring to FIG. 3, the translational motion causes the impeller fragments to impact the upstream circumferential surface 60 of the diffuser ring 36. Due to the area of impact between the diffuser ring 36 and the impeller fragments, the diffusers ring 36 cones, i.e. the upstream surface 60 of the diffuser ring 36 moves radially outwardly, as illustrated by arrow 64, while a downstream surface 62 of the diffuser ring 36 moves radially inwardly, as illustrated by arrow 66. This in turn forces the first and second annular walls 46, 48 apart, as illustrated by arrows 68, thus producing a tensile load in the frangible fasteners 52, 54 which is above a resistance threshold of the weak points. As such, all the frangible fasteners 52, 54 fail substantially simultaneously, directly upon impact, i.e. both sets of fasteners 52, 54 fail under a tensile load mainly or completely produced by the translational motion of the impeller fragments, as opposed to the rotational motion thereof, as further detailed below. The frangible fasteners 52, 54 are said to fail substantially simultaneously since they do not necessarily fail exactly simultaneously; a small offset time between the failure of the fasteners 52, 54 advantageously helps in the reduction of the load transmitted to the structure of the engine 10.

The containment element formed by the diffuser 19 and the inner and outer shrouds 28, 30 is thus separated from the rest of the structure of the engine, namely the first and second walls 46, 48 of the duct 40, directly upon impact of the impeller fragments. The rotational motion of the impeller fragments causes the containment element, now free from the first and second walls 46, 48, to rotate substantially about the impeller drive shaft as a result of friction between the impacting impeller fragments and the diffuser ring 36.

By comparison, fasteners that allow the containment element to remain attached to one or both of the annular walls 46, 48 after the impact caused by the translational motion of the impeller fragments generally resist the rotation of the containment element caused by the rotational motion of the impeller fragments. The friction caused by the rotating impeller fragments create a progressively increasing shear load in the intact fasteners, thus producing a substantial torque that is transmitted to the corresponding wall. This torque increases until the shear load acting on the intact fasteners reaches a given threshold where the fasteners finally break due to the rotational motion of the impeller fragments, separating the containment element from the annular walls 46, 48. Thus, considerable damage can be done to the engine structure due to the large torque transferred through the fasteners while they remain intact. Accordingly, the frangible fasteners 52, 54, by breaking directly upon impact to allow the containment element to freely rotate under the action of the rotational motion of the impeller fragments as opposed to resisting that rotation, avoid the creation of such a substantial torque, thus preventing a substantial load transmission to the structure of the engine 10 (annular walls 46, 48 in the embodiment shown) upon impact of the impeller fragments with the containment element (diffuser ring 36 in the embodiment shown).

In an alternate embodiment, the frangible fasteners 52, 54 are used to connect the diffuser 16 of the high pressure compressor 14 to corresponding walls, for example walls forming the gas generator case 70 (see FIG. 1). Similar frangible fasteners 52, 54 can also be used to connect the diffuser of a thrust producing gas turbine engine to the surrounding engine structure, for example the gas generator case.

The above description is meant to be exemplary only, and one skilled in the art will recognize that changes may be made to the embodiments described without department from the scope of the invention disclosed. For example, the containment system can be used in gas turbine engines acting as auxiliary power units, or alternately in other types of engines, pump, fans, etc., that include a compressor or turbine. Other applications of the containment system, such as in power generators used on land vehicles or in motors utilized in non-aerospace applications, are also considered to be within the scope of the present invention. The frangible fasteners can be used to attach containment elements other than a diffuser, as well as to attach other fixed elements located in a potential path of a burst rotor fragment to the engine structure. Still other modifications which fall within the scope of the present invention will be apparent to those skilled in the art, in light of a review of this disclosure, and such modifications are intended to fall within the appended claims.

What is claimed is:

1. A method of preventing substantial load transmission to a structure of a gas turbine engine upon bursting of a centrifugal compressor impeller thereof, the centrifugal compressor impeller being mounted for rotation about an axis, the method comprising:
    at least partially surrounding the centrifugal compressor impeller with a diffuser ring, the diffuser ring having a circumferentially extending containment surface at least partially surrounding the compressor impeller, the diffuser ring having first and second opposed radial surfaces extending radially with respect to the axis of rotation of the centrifugal compressor impeller;
    frangibly attaching the first radial surface of the diffuser ring to the structure, such that the first radial surface of the diffuser ring is detached from the structure under a predetermined load impact; and
    separately frangibly attaching the second opposed radial surface of the diffuser ring to the structure such that the second radial surface of the diffuser ring is also detached from the structure under the predetermined load impact.

2. The method as defined in claim 1, wherein the step of frangibly attaching the first radial surface of the diffuser ring to the structure includes gripping the diffuser ring and a first wall of the structure with at least one frangible bolt.

3. The method as defined in claim 1, wherein the step of frangibly attaching the second radial surface of the diffuser ring to the structure includes gripping the diffuser ring and a second wall of the structure with at least one frangible bolt.

4. The method as defined in claim 1, wherein the diffuser ring includes at least one threaded bore defined therethrough and extending from the first radial surface to the second radial surface, the step of frangibly attaching the first radial surface of the diffuser ring to the structure including gripping the diffuser ring and the structure with a first frangible bolt received in the at least one threaded bore, and the step of frangibly attaching the second radial surface of the diffuser ring to the structure includes gripping the diffuser ring and the structure with a second frangible bolt received in the at least one threaded bore opposite of the first frangible bolt.

* * * * *